United States Patent
Lengeling

(10) Patent No.: US 8,626,324 B2
(45) Date of Patent: Jan. 7, 2014

(54) ALTERING SOUND OUTPUT ON A VIRTUAL MUSIC KEYBOARD

(75) Inventor: Gerhard Lengeling, Los Altos Hills, CA (US)

(73) Assignee: Apple Inc., Cupertino, CA (US)

(*) Notice: Subject to any disclaimer, the term of this patent is extended or adjusted under 35 U.S.C. 154(b) by 168 days.

(21) Appl. No.: 12/885,252

(22) Filed: Sep. 17, 2010

(65) Prior Publication Data

US 2012/0071994 A1 Mar. 22, 2012

(51) Int. Cl.
*G06F 17/00* (2006.01)
*G06F 3/048* (2013.01)

(52) U.S. Cl.
USPC .............................. 700/94; 715/773

(58) Field of Classification Search
USPC ................. 381/118; 700/94; 715/773
See application file for complete search history.

(56) References Cited

U.S. PATENT DOCUMENTS

| | | | | |
|---|---|---|---|---|
| 5,889,236 A * | 3/1999 | Gillespie et al. | ............ | 178/18.01 |
| 6,915,488 B2 | 7/2005 | Omori et al. | | |
| 8,175,288 B2 * | 5/2012 | Lengeling et al. | ............... | 381/80 |
| 2009/0027338 A1* | 1/2009 | Weinberg et al. | .............. | 345/158 |
| 2009/0093275 A1 | 4/2009 | Oh et al. | | |
| 2009/0256817 A1* | 10/2009 | Perlin et al. | .................... | 345/174 |
| 2010/0053105 A1* | 3/2010 | Choi | .............................. | 345/173 |
| 2010/0287471 A1 | 11/2010 | Nam et al. | | |
| 2011/0088535 A1* | 4/2011 | Zarimis | ........................... | 84/645 |
| 2011/0316793 A1* | 12/2011 | Fushiki | .......................... | 345/173 |
| 2012/0057012 A1* | 3/2012 | Sitrick et al. | .................... | 348/77 |
| 2012/0079410 A1 | 3/2012 | Adam et al. | | |

FOREIGN PATENT DOCUMENTS

JP 2010204162 A * 9/2010

OTHER PUBLICATIONS

Apple iTunes App Store, "PockeStra Piano (Wheel Drive)", by hixtar, updated Sep. 17, 2009 (Available online at http://itunes.apple.com/us/app/pockestra-piano-wheel-drive/id295475453?mt=8, last visited Jul. 17, 2010).

Apple iTunes App Store, "remoteKB for iPad", by nekorl, released Jun. 19, 2010 (Available online at http://itunes.apple.com/us/app/remotekb-for-ipad/id376500525?mt=8, last visited Jul. 17, 2010).

Apple iTunes App Store, "Mobilesynth by Allen Porter", by ECSOS, released Dec. 9, 2009 (Available online at http://itunes.apple.com/us/app/mobilesynth-by-allen-porter/id343230453?mt=8, last visited Jul. 17, 2010).

(Continued)

*Primary Examiner* — Vivian Chin
*Assistant Examiner* — Leonard M Giannone
(74) *Attorney, Agent, or Firm* — Fish & Richardson P.C.

(57) ABSTRACT

Disclosed are systems, methods, and non-transitory computer-readable storage media for altering pitch of a note played on a musical instrument keyboard of a touch-sensitive electronic display. An exemplary method includes playing a note of a key of the keyboard on the touch-sensitive display touched by a user. The method includes continuously altering the pitch of the played note as the user slides a point of contact on the touch-sensitive display horizontally from the key being played across adjacent keys to a second key, in accordance with the keys being contacted during the sliding of the point of contact. In a further aspect, the method includes detecting motion of user contact in a direction other than horizontally across keys of the keyboard, such as vertical, and activating a sound effect in addition to pitch alteration in response to the detection. Example sound effects include tremolo, vibrato, echo, and sound filter effects.

15 Claims, 8 Drawing Sheets

(56) References Cited

OTHER PUBLICATIONS

Apple iTunes App Store, "Bright Keys: Slide, Glide, Volume and Multitouch", by Macsolving, released Jan. 16, 2010 (Available online at http://itunes.apple.com/us/app/bright-keys-slide-glide-volume/id350167953?mt=8, last visited Jul. 17, 2010).

Apple iTunes App Store, "FreePiano+", by tekunodo, released Sep. 18, 2009 (Available online at http://itunes.apple.com/us/app/freepiano/id330945465?mt=8, downloaded Jul. 17, 2010).

Apple iTunes App Store, "Neon Organ Deluxe", by Macsolving, updated Nov. 2, 2009 (Available online at http://itunes.apple.com/us/app/neon-organ-deluxe/id327023631?mt=8#, downloaded Jul. 17, 2010).

Apple iTunes App Store, "VoiceKeyboard HD", by Terry Demco, updated Jun. 6, 2010 (Available online at http://itunes.apple.com/us/app/voicekeyboard-hd/id364923034?mt=8, downloaded Jul. 17, 2010).

Apple iTunes App Store, "Master Piano", by Better Day Wireless, updated May 25, 2010 (Available online at http://itunes.apple.com/us/app/master-piano/id364897373?mt=8#, downloaded Jul. 17, 2010).

Apple iTunes App Store, "Play Piano", by the Useful Group, released Dec. 15, 2009 (Available online at http://itunes.apple.com/us/app/play-piano/id344673559?mt=8, downloaded Jul. 17, 2010).

MooCowMusic, "Pianist—The iPhone Piano (V1.0)." Published Jul. 2, 2008. YouTube.com. Retrieved from the internet: URL<http://www.youtube.com/watch?v=4fE45bT8F6Y>. 1 Page.

The Telegraph, "iPad piano app tested by concert pianist Stephen Hough". Published May 25, 2010. Accessed Jan. 6, 2013. Telegraph.co.uk. Retrieved from the internet: URL<http://www.telegraph.co.uk/technology/technology-video/gadget-inspectors/7765046/iPad-piano-app-tested-by-concert-pianist.html>. 1 Page.

24x7digital, "MiniVLTone for iPhone and iPod Touch." Published Mar. 7, 2009. YouTube.com. Retrieved from the internet: URL<http://www.youtube.com/watch?v=C5EhkL-5sKc>. 1 page.

* cited by examiner

ALTERING SOUND OUTPUT ON A VIRTUAL MUSIC KEYBOARD

FIELD

The following relates to altering sound output on a virtual keyboard on a touch screen device.

BACKGROUND

Some traditional electronic keyboards often have two wheels on their left hand side, generally known as a pitch bend and a modulation wheel. In a common implementation, the pitch bend wheel is spring-loaded to always return to its default center position, while the modulation wheel can be placed freely and will stay where it is placed. In this implementation, the pitch bend wheel controls a pitch of a played note in small values, allowing the simulation of continuous pitch adjustment. In this implementation, the modulation wheel is usually set to control a tremolo effect by default. However, on most electronic keyboards, a user can map any MIDI control to the modulation wheel.

Other traditional electronic keyboards include a pitch bend/modulation joystick that combines the functionality of a separate pitch bend wheel and modulation wheel. Such a joystick allows a user to pitch bend a currently playing note up in pitch by moving the joystick to a right position, down in pitch by moving the joystick to a left position, and apply modulation by moving the joystick into an upward position. The user can end a pitch bend and/or modulation by returning the joystick to a central default position.

Users skilled with pitch bend and modulation controllers can create very expressive and unique sounds that are very difficult to create without such controllers. However traditional pitch bend and modulation controllers contain limitations. For example, many traditional pitch bend controllers can only adjust a pitch within +/−2 half steps. Additionally, if a user wishes to use a pitch bend controller to adjust a pitch to a second known pitch, the user must rely on his or her own pitch detection skills to determine when the second pitch is reached.

Current touch screen devices, such as tablet computers, can execute programs to present a virtual music instrument keyboard that allows a user to play and create music and sounds. Users of such devices can benefit from a method and system for visually applying pitch bending to a note played on a virtual keyboard on a touch screen device. Users can benefit from a method and system for visually applying pitch bending that allows precise pitch bending from a displayed note on a virtual keyboard to any other displayed note. Users can further benefit from a method and system for applying modulation, or other sound effects, to the note played on the virtual keyboard on the touch screen device.

SUMMARY

Disclosed are systems, methods, and non-transitory computer-readable storage media for altering pitch of a note played on a musical instrument keyboard of a touch-sensitive electronic display. An exemplary method includes playing a note of a key of the keyboard on the touch-sensitive display touched by a user. The method includes continuously altering the pitch of the played note as the user slides a point of contact on the touch-sensitive display horizontally from the key being played across adjacent keys to a second key, in accordance with the keys being contacted during the sliding of the point of contact.

In a further aspect, the method includes detecting motion of user contact in a direction other than horizontally across keys of the keyboard, such as vertical, and activating a sound effect in addition to pitch alteration in response to the detection. Example sound effects include vibrato, echo, and sound filter effects.

Many other aspects and examples will become apparent from the following disclosure.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION

The method, system, and computer-readable medium for altering pitch of a note played on a musical instrument keyboard of a touch-sensitive electronic display can be implemented on a computer. The computer can be a data-processing system suitable for storing and/or executing program code. The computer can include at least one processor that is coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data-processing systems or remote printers or storage devices through intervening private or public networks. Modems, cable modems, and Ethernet cards are just a few of the currently available types of network adapters. In one or more embodiments, the computer can be a desktop computer, laptop computer, or dedicated device.

Figure 1:
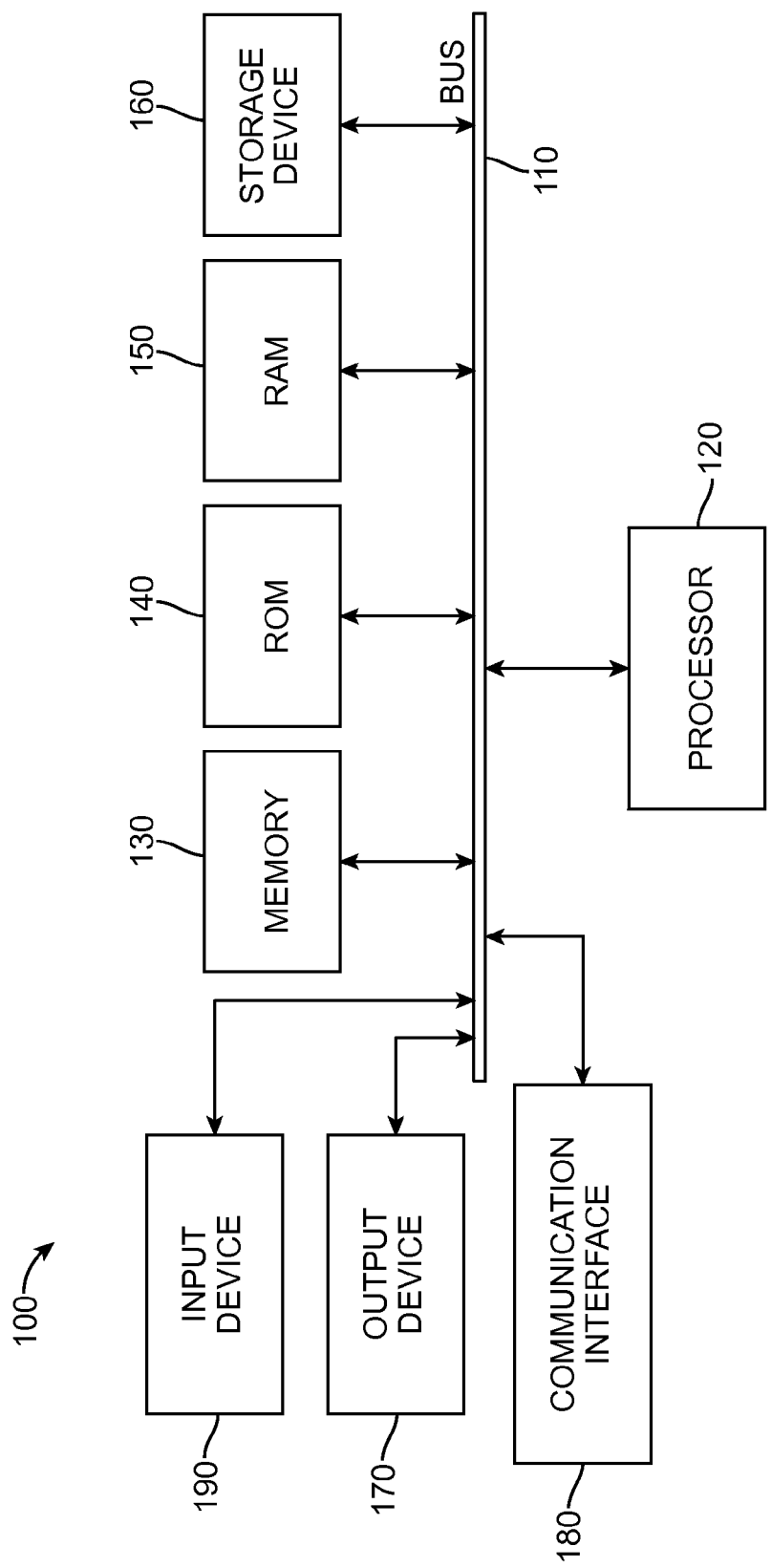
FIG. 1 illustrates hardware components associated with a system embodiment.

FIG. 1 illustrates the basic hardware components associated with the system embodiment of the disclosed technology. As shown in FIG. 1, an exemplary system includes a general-purpose computing device 100, including a processor, or processing unit (CPU) 120 and a system bus 110 that couples various system components including the system memory such as read only memory (ROM) 140 and random access memory (RAM) 150 to the processing unit 120. Other system memory 130 may be available for use as well. It will be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer-readable media provide nonvolatile storage of computer-readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer-readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms such as a touch-sensitive screen for gesture or graphical input, accelerometer, keyboard, mouse, motion input, speech and so forth. The device output 170 can also be one or more of a number of output mechanisms known to those of skill in the art, such as a display or speakers. In some instances, multimodal systems enable a user to provide multiple types of input to communicate with the computing device 100. The communications interface 180 generally governs and manages the user input and system output. There is no restriction on the disclosed technology operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including but not limited to hardware capable of executing software. For example a single shared processor or multiple processors may provide the functions of one or more processors shown in FIG. 1. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The technology can take the form of an entirely hardware-based embodiment, an entirely software-based embodiment, or an embodiment containing both hardware and software elements. In one embodiment, the disclosed technology can be implemented in software, which includes but may not be limited to firmware, resident software, microcode, etc. Furthermore, the disclosed technology can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers may not be included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk read only memory (CD-ROM), compact disk read/write (CD-R/W), and DVD. Both processors and program code for implementing each as aspects of the technology can be centralized and/or distributed as known to those skilled in the art.

MIDI (Musical Instrument Digital Interface) is an industry-standard protocol that enables electronic musical instruments, such as keyboard controllers, computers, and other electronic equipment, to communicate, control, and synchronize with each other. MIDI does not transmit an audio signal or media, but rather transmits "event messages" such as the pitch and intensity of musical notes to play, control signals for parameters such as volume, vibrato and panning, cues, and clock signals to set the tempo. As an electronic protocol, MIDI is notable for its widespread adoption throughout the industry.

Figure 2:
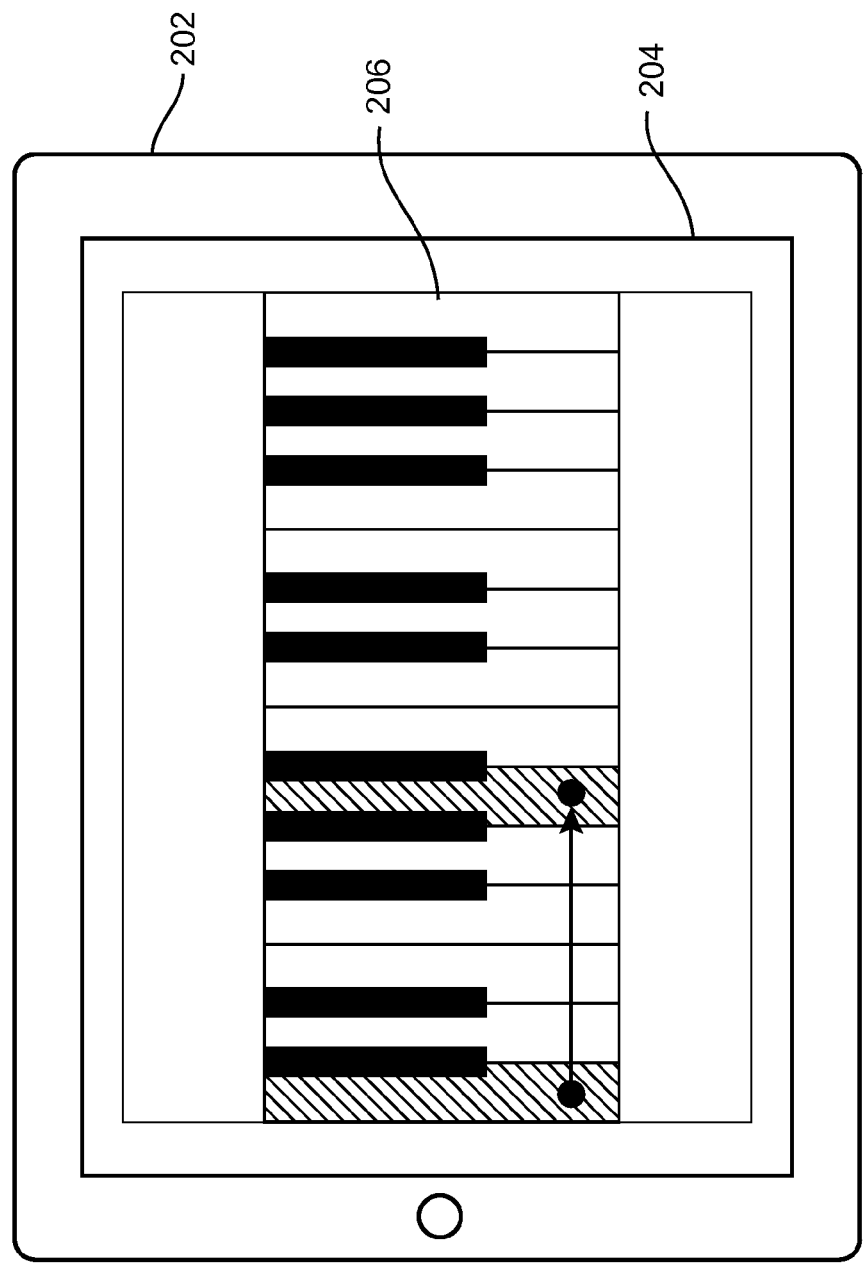
FIG. 2 illustrates a musical keyboard interface in which a user slides a point of contact to create a pitch bend up.

FIG. 2 illustrates a musical keyboard interface in which a user slides a point of contact to create a pitch bend up. FIG. 2 includes a wireless touch screen device 202. Wireless touch screen device 202 includes a touch sensitive display 204. Display 204 is displaying a musical instrument keyboard interface 206. Musical instrument keyboard interface 206 displays two octaves from C3 to B4 as shown.

In FIG. 2, a user has input with a finger on the display 204 over the C3 note on the musical instrument keyboard interface 206. This causes a processor to output a note corresponding to C3 on the musical instrument keyboard interface 206 to an audio output, such as speakers or headphones.

As shown in FIG. 2, a user slides a point of contact on the touch-sensitive display horizontally from the key being played, C3, across adjacent keys to a second key, A3. A module, such as a processor, causes continuous pitch alteration of the played note as the user slides the point of contact on the touch-sensitive display horizontally from the key being played, C3, across adjacent keys to the second key, A3, in accordance with the keys contacting during the sliding of the point of contact. Advantageously, this horizontal swipe gesture along instrument keyboard interface 206 allows a user to pitch bend from the first key C3 to the second key A3. In this implementation, a user can pitch bend from any visible key to any other visible key on instrument keyboard interface 206. This implementation allows a user to pitch between notes that would not be possible using a conventional music keyboard or MIDI controller. A traditional pitch bend wheel or joystick is only typically capable of adjusting pitch of a note in the range of ±1 tone. This implementation allows pitch bends of an octave or more with precision as to a starting and ending point.

Figure 3:
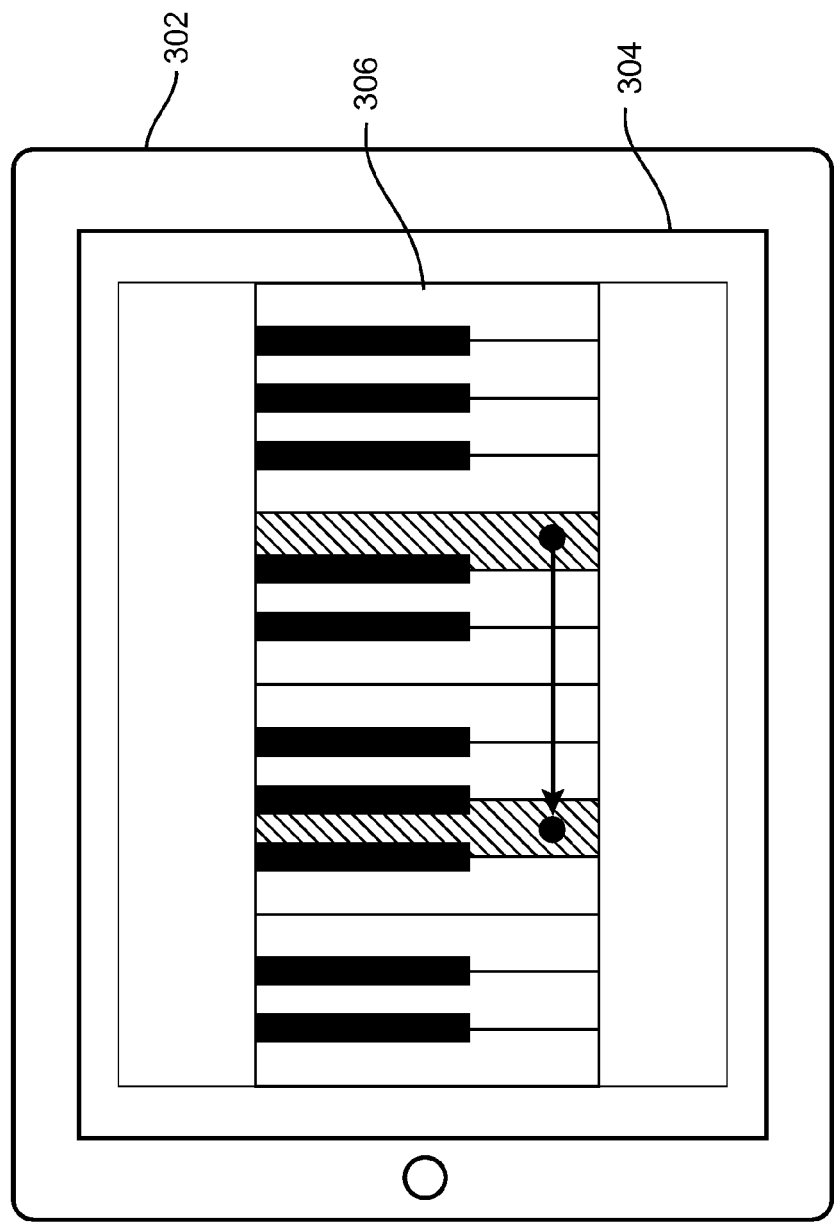
FIG. 3 illustrates a musical keyboard interface in which a user slides a point of contact to create a pitch bend down.

FIG. 3 illustrates a musical keyboard interface in which a user slides a point of contact to create a pitch bend down. FIG. 3 includes a wireless touch screen device 302. Wireless touch screen device 302 includes a touch sensitive display 304. Display 304 is displaying a musical instrument keyboard interface 306. Musical instrument keyboard interface 306 displays two octaves from C3 to B4 as shown.

In FIG. 3, a user has input with a finger on the display 304 over the E4 note on the musical instrument keyboard interface 306. This causes a processor to output a note corresponding to E4 on the musical instrument keyboard interface 306 to an audio output, such as speakers or headphones.

As shown in FIG. 3, a user slides a point of contact on the touch-sensitive display horizontally from the key being played, E4, across adjacent keys to a second key, G3. A module, such as a processor, causes continuous pitch alteration of the played note as the user slides the point of contact on the touch-sensitive display horizontally form the key being played, E4, across adjacent keys to the second key, G3, in accordance with the keys contacting during the sliding of the point of contact. Advantageously, this horizontal swipe gesture along instrument keyboard interface 206 allows a user to pitch bend from the first key E4 down to the second key G3.

Figure 4:
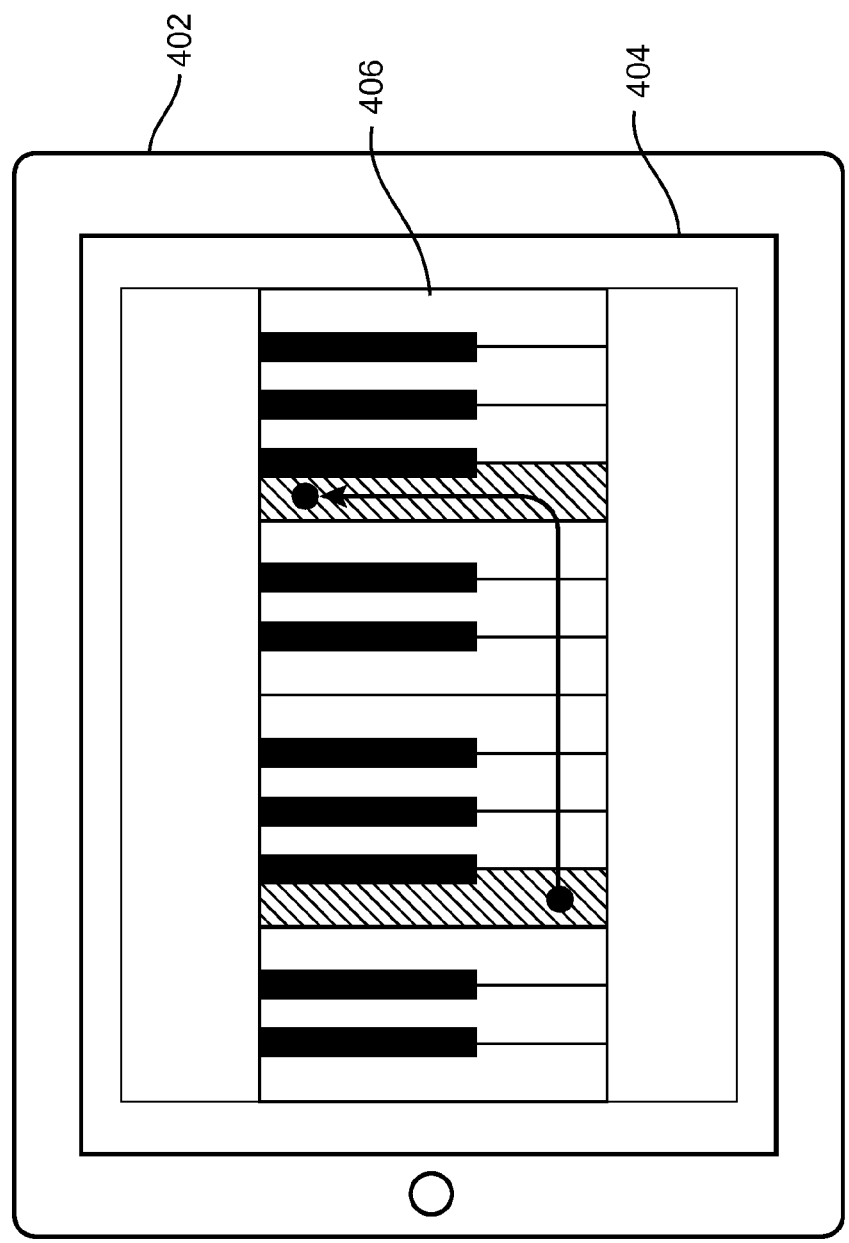
FIG. 4 illustrates a musical keyboard interface in which a user slides a point of contact to create a pitch bend up and apply a sound effect.

FIG. 4 illustrates a musical keyboard interface in which a user slides a point of contact to create a pitch bend up and apply a sound effect. FIG. 4 includes a wireless touch screen device 402. Wireless touch screen device 402 includes a touch sensitive display 404. Display 404 is displaying a musical instrument keyboard interface 406. Musical instrument keyboard interface 406 displays two octaves from C3 to B4 as shown.

In FIG. 4, a user has input with a finger on the display 404 over the F3 note on the musical instrument keyboard interface 406. This causes a processor to output a note corresponding to F3 on the musical instrument keyboard interface 406 to an audio output, such as speakers or headphones.

As shown in FIG. 4, a user slides a point of contact on the touch-sensitive display horizontally and vertically from the key being played, F3, across adjacent keys to a second key, F4. A module, such as a processor, causes continuous pitch alteration of the played note as the user slides the point of contact on the touch-sensitive display horizontally form the key being played, F3, across adjacent keys to the second key, F4, in accordance with the keys contacting during the sliding of the point of contact.

Furthermore, a module, such as the processor, detects motion of user contact in a vertical direction across keys of the keyboard, and activates a sound effect in addition to pitch alteration. The sound effect is in one example a tremolo effect. Those of skill in the art will recognize other effects that can be applied to this vertical component of the user contact. Advantageously, this swipe gesture, including a horizontal and vertical component along instrument keyboard interface 406, allows a user to pitch bend from the first key F3 up to the second key F4 based on the horizontal component of the user contact, and apply a sound effect, for example tremolo, based on the vertical component of the user contact. This allows a user to apply precise pitch bending and sound effects through user swipe gestures.

Figure 5:
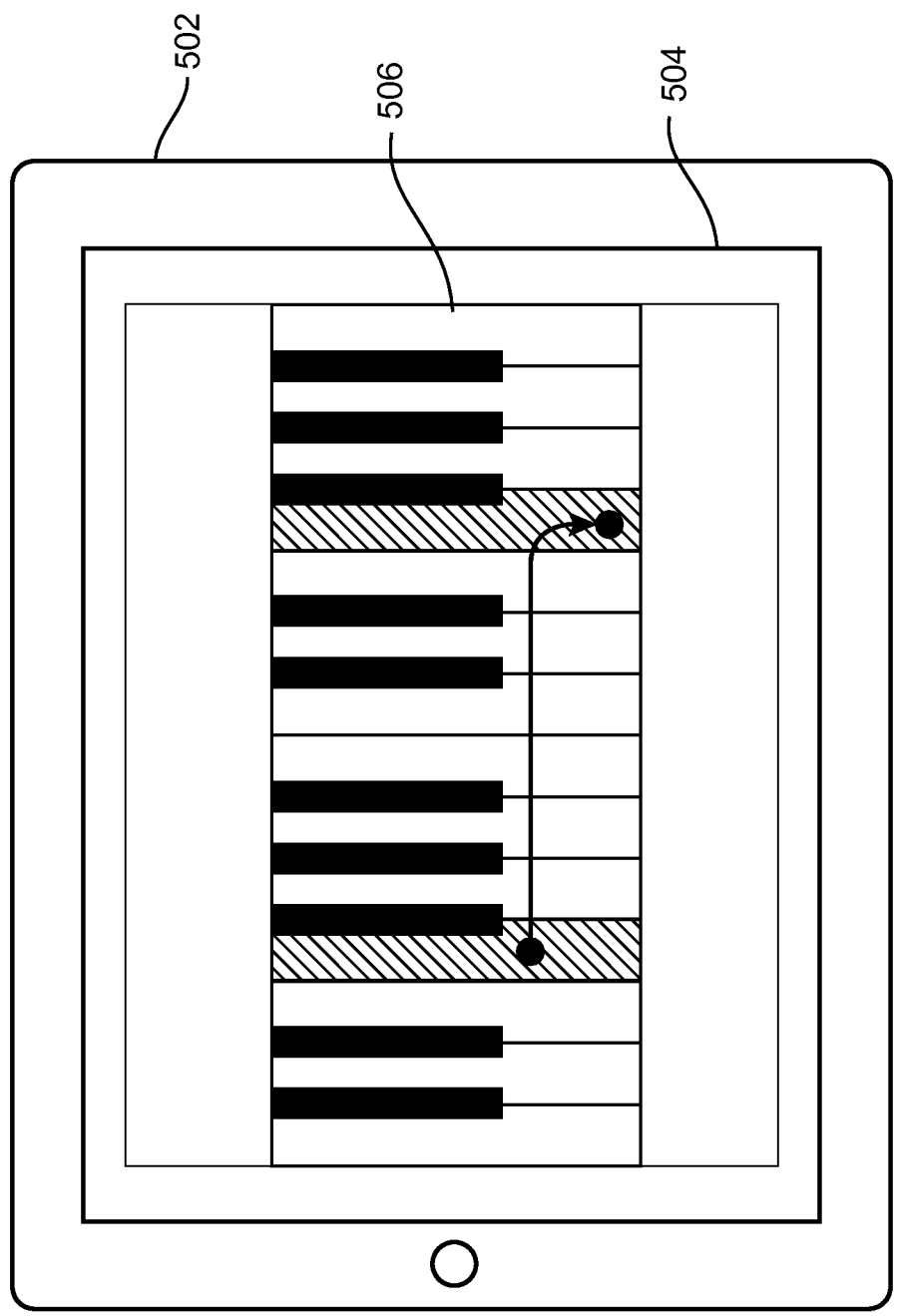
FIG. 5 illustrates a musical keyboard interface in which a user slides a point of contact to create a pitch bend up and apply a sound effect.

FIG. 5 illustrates a musical keyboard interface in which a user slides a point of contact to create a pitch bend up and apply a sound effect. FIG. 5 includes a wireless touch screen device 502. Wireless touch screen device 502 includes a touch sensitive display 504. Display 504 is displaying a musical instrument keyboard interface 506. Musical instrument keyboard interface 506 displays two octaves from C3 to B4 as shown.

In FIG. 5, a user has input with a finger on the display 504 over the F3 note on the musical instrument keyboard interface 506. This causes a processor to output a note corresponding to F3 on the musical instrument keyboard interface 506 to an audio output, such as speakers or headphones.

As shown in FIG. 5, a user slides a point of contact on the touch-sensitive display horizontally and vertically from the key being played, F3, across adjacent keys to a second key, F4. A module, such as a processor, causes continuous pitch alteration of the played note as the user slides the point of contact on the touch-sensitive display horizontally form the key being played, F3, across adjacent keys to the second key, F4, in accordance with the keys contacting during the sliding of the point of contact.

Furthermore, a module, such as the processor, detects motion of the user contact in a vertical direction across keys of the keyboard, and activates a sound effect in addition to pitch alteration. The sound effect is in one example a cutoff filter effect. The effect lowers a frequency threshold of a low-pass filter for an output sound. Those of skill in the art will recognize other effects that can be applied to this vertical component of the user contact. Advantageously, this swipe gesture, including a horizontal and vertical component along instrument keyboard interface 506, allows a user to pitch bend from the first key F3 up to the second key F4 based on the horizontal component of the user contact, and apply a sound effect, for example lowering a filter-cutoff, based on the downward vertical component of the user contact. This allows a user to visually and precisely apply pitch bending and sound effects through user swipe gestures.

In one embodiment a swipe gesture including a horizontal and vertical component along instrument keyboard interface 506 can apply a first sound effect if the vertical component is upward and a completely different sound effect if the vertical component is downward.

In another embodiment, a swipe gesture including a horizontal and vertical component along instrument keyboard interface 506 can apply a first sound effect if the vertical component is upward and the same first effect if the vertical component is downward. In one example, an upward vertical component and downward vertical component can affect the first sound effect in the same way. In another example, an upward vertical component and downward vertical component can affect the first sound effect in different ways. These examples are merely illustrative and any method of adjusting a sound effect can be linked to a vertical component of a user swipe gesture.

Figure 6:
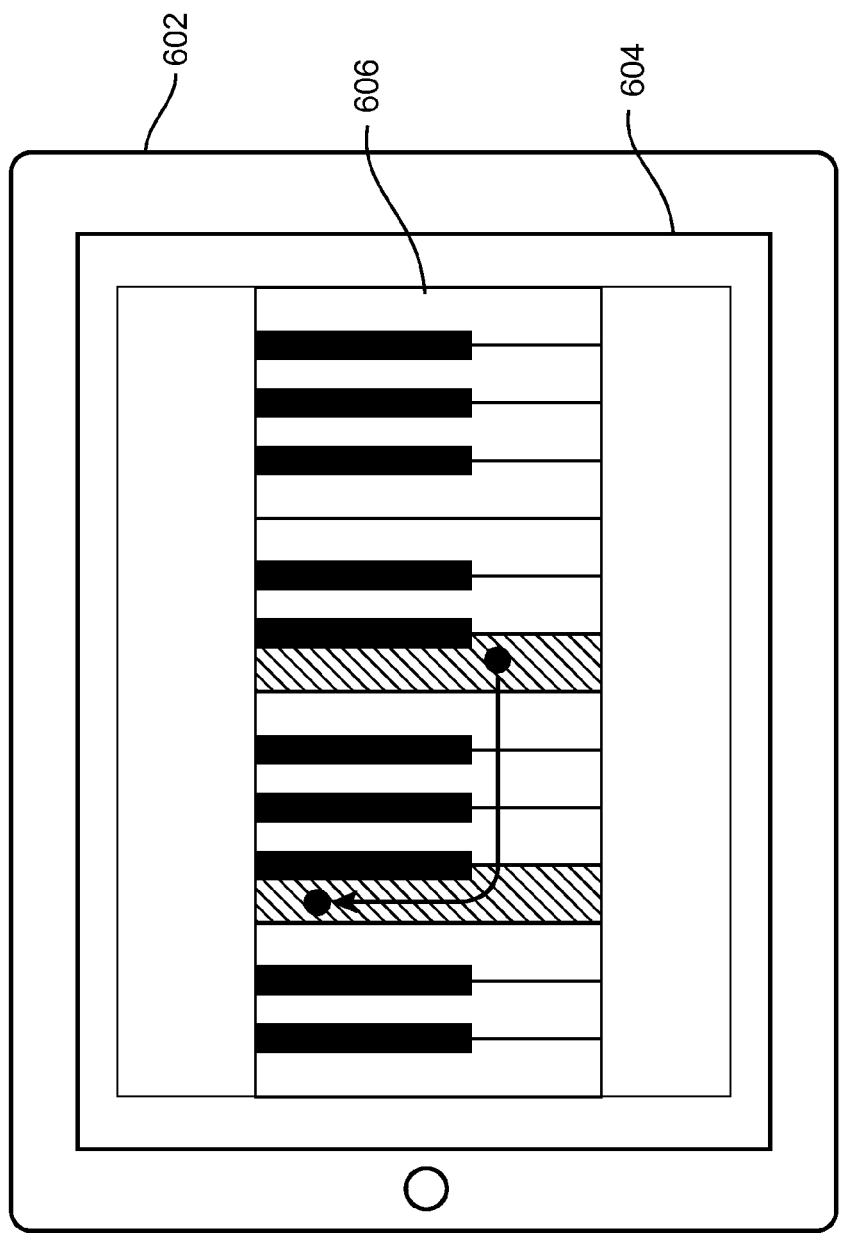
FIG. 6 illustrates a musical keyboard interface in which a user slides a point of contact to create a pitch bend down and apply a sound effect.

FIG. 6 illustrates a musical keyboard interface in which a user slides a point of contact to create a pitch bend down and apply a sound effect. FIG. 6 includes a wireless touch screen device 602. Wireless touch screen device 602 includes a touch sensitive display 604. Display 604 is displaying a musical instrument keyboard interface 606. Musical instrument keyboard interface 606 displays two octaves from C3 to B4 as shown.

In FIG. 6, a user has input with a finger on the display 604 over the C4 note on the musical instrument keyboard interface 606. This causes a processor to output a note corresponding to C4 on the musical instrument keyboard interface 606 to an audio output, such as speakers or headphones. In one example, the processor will stop outing the note when the user lifts their finger from the display 604.

As shown in FIG. 6, a user slides a point of contact on the touch-sensitive display horizontally and vertically from the key being played, C4, across adjacent keys to a second key, F3. A module, such as a processor, causes continuous pitch alteration of the played note as the user slides the point of contact on the touch-sensitive display horizontally from the key being played, C4, across adjacent keys to the second key, F3, in accordance with the keys contacting during the sliding of the point of contact.

Furthermore, a module, such as the processor, detects motion of the user contact in a vertical direction across keys of the keyboard, and actives a sound effect in addition to pitch alteration. The sound effect is in one example a vibrato effect. The effect oscillates the audio output with a low frequency oscillator to create this vibrato. Those of skill in the art will recognize other effects that can be applied to this vertical component of the user contact. Advantageously, this swipe gesture, including a horizontal and vertical component along instrument keyboard interface 606, allows a user to pitch bend from the first key C4 down to the second key F3 based on the horizontal component of the user contact, and apply a sound effect, for example vibrato, based on the downward vertical component of the user contact.

Figure 7:
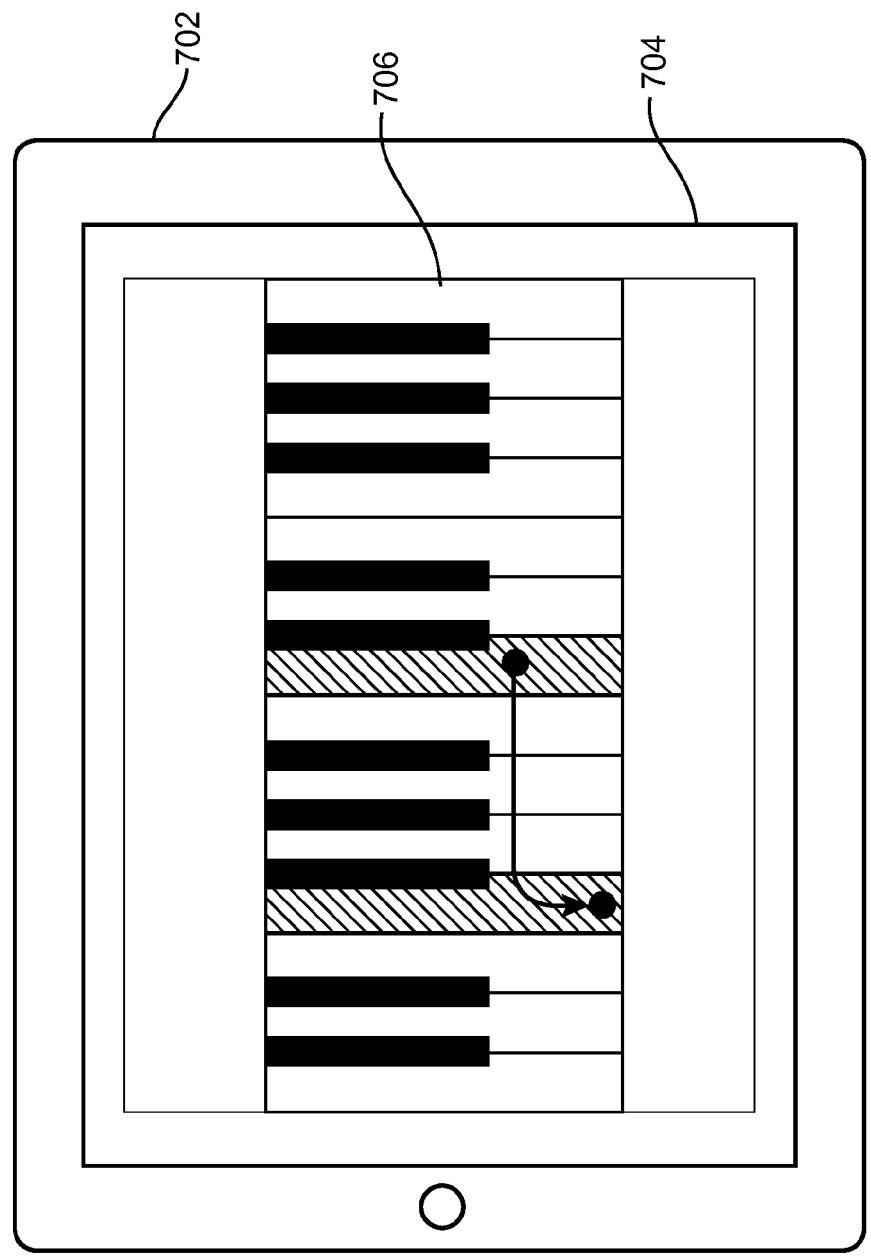
FIG. 7 illustrates a musical keyboard interface in which a user slides a point of contact to create a pitch bend down and apply a sound effect.

FIG. 7 illustrates a musical keyboard interface in which a user slides a point of contact to create a pitch bend down and apply downward modulation. FIG. 7 includes a wireless touch screen device 702. Wireless touch screen device 702 includes a touch sensitive display 704. Display 704 is displaying a musical instrument keyboard interface 706. Musical instrument keyboard interface 706 displays two octaves from C3 to B4 as shown.

In FIG. 7, a user has input with a finger on the display 604 over the C4 note on the musical instrument keyboard interface 706. This causes a processor to output a note corresponding to C4 on the musical instrument keyboard interface 706 to an audio output, such as speakers or headphones. In one example, the processor will stop outputting the note when the user lifts their finger from the display 704.

As shown in FIG. 7, a user slides a point of contact on the touch-sensitive display horizontally and vertically from the key being played, C4, across adjacent keys to a second key, F3. A module, such as a processor, causes continuous pitch alteration of the played note as the user slides the point of contact on the touch-sensitive display horizontally from the key being played, C4, across adjacent keys to the second key, F3, in accordance with the keys contacting during the sliding of the point of contact.

Furthermore, a module, such as the processor, detects motion of the user contact in a vertical direction across keys of the keyboard, and actives a sound effect in addition to pitch alteration. The sound effect is in one example a filter-cutoff effect. The effect lowers a cutoff frequency threshold of a low-pass filter for an output sound. Those of skill in the art will recognize other effects that can be applied to this vertical component of the user contact. Advantageously, this swipe gesture including a horizontal and vertical component along instrument keyboard interface 706 allows a user to pitch bend from the first key C4 down to the second key F3 based on the horizontal component of the user contact, and apply a sound effect, for example lowering a cutoff frequency of a low-pass filter, based on the downward vertical component of the user contact.

Figure 8:
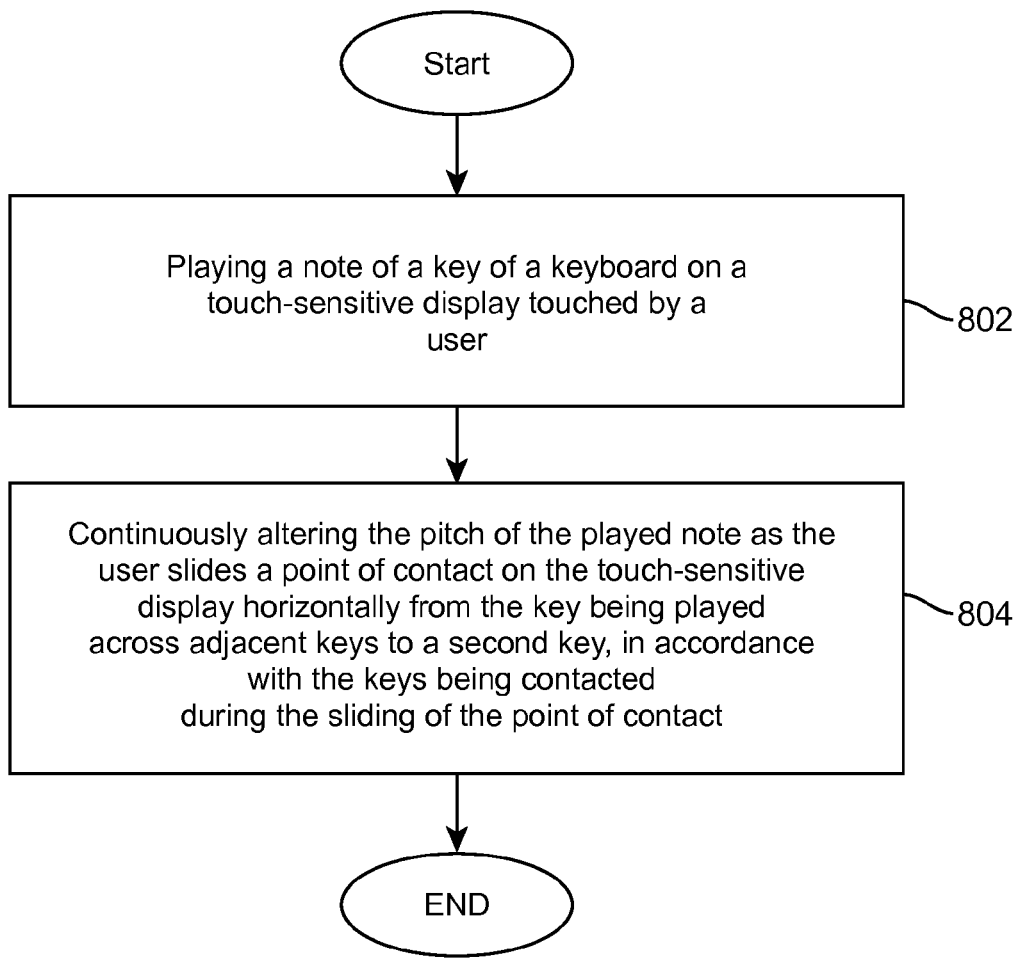
FIG. 8 is a flowchart for altering pitch of a note played on a musical instrument keyboard of a touch-sensitive electronic display.

FIG. 8 is a flowchart for altering pitch of a note played on a musical instrument keyboard of a touch-sensitive electronic display. As shown in FIG. 8, block 802 includes playing a note of a key of the keyboard on the touch-sensitive display touched by a user. In one example, playing the note can include playing piano sound samples. In another example, playing the note can correspond to synthesizer or electric piano software instruments. These are merely illustrative and any software instrument can be used.

Block 804 includes continuously altering the pitch of the played note as the user slides a point of contact on the touch-sensitive display horizontally from the key being played across adjacent keys to a second key, in accordance with the keys being contacted during the sliding of the point of contact. In this example, the rate of change of continuously altering the pitch of the played note is linked to a speed associated with the user contact.

In one example, the pitch alteration is associated with a non-scroll mode of said keyboard. This example can benefit a user who wishes to input pitch bends and modulation or sound effect changes instead of scrolling a virtual keyboard with user gesture swipes including a horizontal component.

In a further aspect, the method of FIG. 8 can include detecting motion of user contact in a direction other than horizontally across keys of said keyboard, and activating a sound effect in addition to pitch alteration in response to said detection. The sound effect can be, for example, tremolo, vibrato, adjusting a low-pass filter's cutoff frequency, delay, echo, or an additional pitch alteration. Any effect that can be applied to a MIDI modulation wheel can be applied to this detected user motion. In one example, the other direction of user contact is a vertical direction.

Embodiments within the scope of the present disclosure may also include tangible and/or non-transitory computer-readable storage media for carrying or having computer executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The above disclosure provides examples within the scope of claims, appended hereto or later added in accordance with applicable law. However, these examples are not limiting as to how any disclosed embodiments may be implemented, as those of ordinary skill can apply these disclosures to particular situations in a variety of ways.

The invention claimed is:

1. A method comprising:
   displaying a musical keyboard on a touch sensitive display of a mobile device, the keyboard having a plurality of keys, each key associated with a respective note;
   receiving touch input from a user at a point of contact on the touch sensitive display, the point of contact corresponding to a particular key of the keyboard;
   while continuing to receive the touch input;
      playing a note associated with the particular key of the keyboard;
      detecting movement of the point of contact as the user slides the point of contact horizontally from the particular key across adjacent keys to a second key;
      in response to the movement of the point of contact across the keys of the keyboard, continuously altering the pitch of the played note according to the keys being contacted during the sliding of the point of contact;
      detecting movement of the point of contact in an essentially vertical direction across a key of said keyboard; and
      in response to the essentially vertical movement, activating a sound effect in addition to pitch alteration.

2. The method of claim 1, wherein said sound effect is a vibrato effect.

3. The method of claim 1, wherein said sound effect is a delay effect.

4. The method of claim 1, wherein said other direction is a vertical direction.

5. The method of claim 1, wherein said sound effect is an additional pitch alteration.

6. A non-transitory computer-readable medium including one or more sequences of instructions which, when executed by one or more processors, causes:
   displaying a musical keyboard on a touch sensitive display of a mobile device, the keyboard having a plurality of keys, each key associated with a respective note;
   receiving touch input from a user at a point of contact on the touch sensitive display, the point of contact corresponding to a particular key of the keyboard;
   while continuing to receive the touch input;
      playing a note associated with the particular key of the keyboard;
      detecting movement of the point of contact as the user slides the point of contact horizontally from the particular key across adjacent keys to a second key;
      in response to the movement of the point of contact across the keys of the keyboard, continuously altering the pitch of the played note according to the keys being contacted during the sliding of the point of contact;
      detecting movement of the point of contact in an essentially vertical direction across a key of said keyboard; and
      in response to the essentially vertical movement, activating a sound effect in addition to pitch alteration.

7. The method of claim 6, wherein said sound effect is a vibrato effect.

8. The method of claim 6, wherein said sound effect is a delay effect.

9. The method of claim 6, wherein said other direction is a vertical direction.

10. The method of claim 6, wherein said sound effect is an additional pitch alteration.

11. A system comprising:
    one or more processors; and
    a non-transitory computer-readable medium including one or more sequences of instructions which, when executed by the one or more processors, causes:
       displaying a musical keyboard on a touch sensitive display of a mobile device, the keyboard having a plurality of keys, each key associated with a respective note;
       receiving touch input from a user at a point of contact on the touch sensitive display, the point of contact corresponding to a particular key of the keyboard;
       while continuing to receive the touch input;
          playing a note associated with the particular key of the keyboard;
          detecting movement of the point of contact as the user slides the point of contact horizontally from the particular key across adjacent keys to a second key;
          in response to the movement of the point of contact across the keys of the keyboard, continuously altering the pitch of the played note according to the keys being contacted during the sliding of the point of contact;
          detecting movement of the point of contact in an essentially vertical direction across a key of said keyboard; and
          in response to the essentially vertical movement, activating a sound effect in addition to pitch alteration.

12. The method of claim 11, wherein said sound effect is a vibrato effect.

13. The method of claim 11, wherein said sound effect is a delay effect.

14. The method of claim 11, wherein said other direction is a vertical direction.

15. The method of claim 11, wherein said sound effect is an additional pitch alteration.

* * * * *

UNITED STATES PATENT AND TRADEMARK OFFICE
CERTIFICATE OF CORRECTION

PATENT NO.         : 8,626,324 B2
APPLICATION NO.    : 12/885252
DATED              : January 7, 2014
INVENTOR(S)        : Gerhard Lengeling It is certified that error appears in the above-identified patent and that said Letters Patent is hereby corrected as shown below:

In the Claims:

In Claim 7, column 10, line 20, delete "method" and insert -- non-transitory computer-readable medium --.

In Claim 8, column 10, line 22, delete "method" and insert -- non-transitory computer-readable medium --.

In Claim 9, column 10, line 24, delete "method" and insert -- non-transitory computer-readable medium --.

In Claim 10, column 10, line 26, delete "method" and insert -- non-transitory computer-readable medium --.

In Claim 12, column 10, line 56, delete "method" and insert -- system --.

In Claim 13, column 10, line 58, delete "method" and insert -- system --.

In Claim 14, column 10, line 60, delete "method" and insert -- system --.

In Claim 15, column 10, line 62, delete "method" and insert -- system --.

Signed and Sealed this
Third Day of June, 2014

Michelle K. Lee
*Deputy Director of the United States Patent and Trademark Office*